United States Patent

[11] 3,625,572

[72] Inventor Guy Marouby
 Neuilly, France
[21] Appl. No. 858,662
[22] Filed Sept. 17, 1969
[45] Patented Dec. 7, 1971
[73] Assignee Societe Anonyme D.B.A.
 Paris, France
[32] Priority Oct. 10, 1968
[33] France
[31] 169427

[54] ANTISKID DEVICE FOR A VEHICLE-BRAKING SYSTEM
 1 Claim, 3 Drawing Figs.
[52] U.S. Cl. .................................................. 303/21 BE,
 188/181 A, 303/20, 324/162
[51] Int. Cl. ............................................................ B60t 8/04
[50] Field of Search ............................................ 188/181 A,
 181 C, 181 T; 303/21 A, 21 BE, 21 BB, 21 F, 21
 EB, 21 CG, 21 C, 21 F, 20, 21 (A4); 307/121;
 324/162; 340/262

[56] References Cited
 UNITED STATES PATENTS
3,467,444 9/1969 Leiber .......................... 303/21 BE
3,547,501 12/1970 Harned et al. ................. 303/21 BE
3,494,671 2/1970 Slavin et al. ................... 303/21 (A4)
3,498,683 3/1970 Leiber .......................... 188/181 A Primary Examiner—Milton Buchler
Assistant Examiner—Stephen G. Kunin
Attorneys—William N. Antonis, Ken C. Decker and Plante, Hartz, Smith & Thompson ABSTRACT: An antiskid device for a vehicle-braking system having an electronic sensing unit selectively controlling the operation of an actuating unit formed of two components. Once the braking pressure has been applied to the braking system, one of the components is selectively activated to isolate the brake pedal from the braking system between one instant corresponding to a predetermined threshold of wheel deceleration and another instant substantially corresponding to the end of the wheel acceleration period which follows the wheel deceleration period while the other component is selectively activated to progressively release the pressure in the braking system to a certain value between said one instant corresponding to said predetermined threshold of wheel deceleration and still another instant corresponding to a second predetermined threshold of wheel deceleration which is closed to the point of zero deceleration (or acceleration), the pressure in the isolated braking system being maintained to the said value until the instant substantially corresponding to the end of the wheel acceleration period which follows the wheel deceleration period, i.e. until the moment where the brake foot pedal may become again operative and may generate, due to the deceleration of the wheel, a succeeding operating cycle.

ANTISKID DEVICE FOR A VEHICLE-BRAKING SYSTEM

The present invention relates to an antiskid device for a vehicle-braking system and more particularly to such an antiskid device utilizing electronic sensing unit.

An antiskid device, which is a device adapted to prevent the wheels' locking up during braking, is generally formed of a sensing unit and an actuating unit. The sensing unit is provided to sense a parameter related to braking so as to produce a control signal and then to address this control signal to the actuating unit which responds thereto by providing a decrease or cancellation of the braking action.

In the past antiskid devices utilizing electronic sensing unit have been proposed. A typical antiskid device of this type is formed of an electronic sensing unit for sensing the vehicle wheel speed and producing therefrom a control signal, and an actuating unit responding to said control signal for substantially decreasing or cancelling the pressure in the vehical-braking system, with the electronic sensing unit comprising a speed signal generator for generating a speed signal which is proportional to wheel speed, an acceleration signal generator for generating from the speed signal an acceleration signal which is proportional to wheel deceleration or acceleration, and means for generating the control signal which is responsive to a first value of the acceleration signal to initiate the production of the control signal and to a second value of the acceleration signal to interrupt the production of the control signal.

These antiskid devices utilizing electronic sensing unit have therefore an on and off mode of operation, since in response to the appearance and disappearance of the control signal, the actuating unit substantially decreases or cancels and then reestablishes the pressure in the vehicle-braking system. It has been found that for such a mode of operation the stopping distance was relatively large.

According to the present invention, in order to substantially reduce the stopping distance, the actuating unit is formed of two components, one of the components operating, once the braking pressure has been applied, to isolate the brake pedal from the vehicle-braking system during a time interval beginning at an instant corresponding to a predetermined threshold of wheel deceleration and terminating at an instant substantially corresponding to the end of the wheel acceleration period which follows the wheel deceleration period, and the other component operating to progressively release the pressure in the vehicle-braking system to a certain value during a time interval beginning at the instant corresponding to said predetermined threshold of wheel deceleration and terminating at an instant corresponding to a second predetermined threshold of wheel deceleration which is close to the zero value of wheel deceleration (or acceleration), the pressure in the isolated braking system remaining at the said pressure value between the instant corresponding to the second predetermined threshold of wheel deceleration and the instant substantially corresponding to the end of the wheel acceleration period which follows the wheel deceleration period, that is until the moment where the brake pedal may become again active and produce, due to wheel deceleration, a succeeding cycle of operation.

Accordingly, an object of the present invention is to provide an antiskid device for a vehicle-braking system capable to substantially reduce the stopping distance thanks to an actuating unit formed of an isolating element and a releasing element selectively controlled.

The preferred embodiments of the invention will now be described by way of example with reference to the accompanying drawings, in which.

Figure 1:
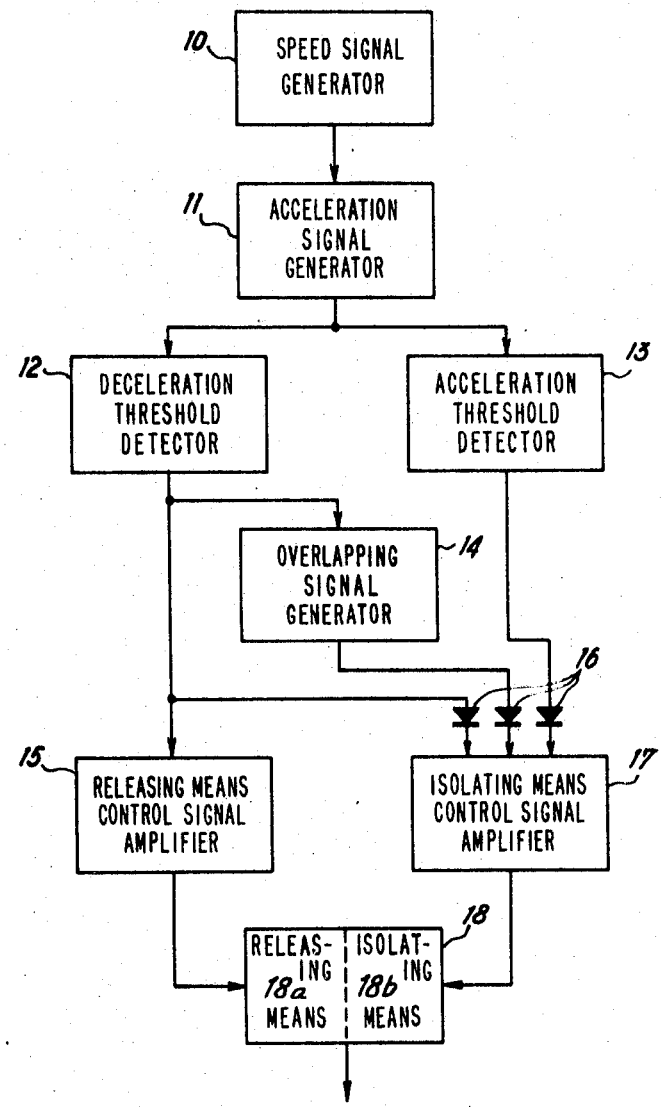
FIG. 1 represents in block form an antiskid device according to the invention for a single wheel.

Referring now to FIG. 1 of the drawings there is disclosed a first embodiment of antiskid device for a single wheel comprising a sensing unit formed of a speed signal generator 10, an acceleration (or deceleration) signal generator 11, a threshold detector 12 for the deceleration portion $-\gamma$ of the acceleration signal, a threshold detector 13 for the acceleration portion $+\gamma$ of the acceleration signal, an overlapping signal generator 14, a releasing control signal amplifier 15, an isolating control signal amplifier 17, and an actuating unit 18 formed of a releasing electrovalve 18a and an isolating electrovalve 18b, the output of the actuating unit 18 acting upon the braking system.

The speed signal generator 10 senses the wheel speed and converts it into a signal voltage having a level correlative to wheel speed. The generator 10 may suitably be either a tachometric generator directly delivering a signal voltage proportional to wheel speed or a variable-reluctance alternating-current-type generator providing a signal having a frequency varying directly as the wheel speed and which is converted in a frequency-voltage converter into a signal voltage proportional to wheel speed.

The acceleration (or deceleration) signal generator 11 receives the speed signal and differentiates it so as to provide a signal voltage correlative to wheel deceleration or acceleration. The generator 11 comprises, for example, a R-C circuit driving an operational amplifier.

The threshold detector 12 receives the acceleration signal but is only responsive to the deceleration portion $-\gamma$ thereof. This detector develops a first control signal as soon as the deceleration portion $-\gamma$ of the acceleration signal exceeds a level corresponding to a predetermined wheel deceleration threshold. This deceleration threshold is practically included within 10 to 80 m./sec./sec. The detector 12 may be constituted by a Schmitt trigger, utilizing an operational amplifier, which is switched from its initial stable condition into its second stable condition as soon as the deceleration portion $-\gamma$ of the acceleration signal reaches a predetermined level and which is again switched into its initial stable condition when the level of the deceleration portion $-\gamma$ of the acceleration signal becomes again substantially equal to the said predetermined level. The Schmitt trigger develops a control signal as long as it remains in its second stable condition.

The threshold detector 13 receives the acceleration signal but is only responsive to the acceleration portion $+\gamma$ thereof. This detector develops a second control signal as soon as the acceleration portion $+\gamma$ of the acceleration signal exceeds a level corresponding to a predetermined wheel acceleration threshold. This acceleration threshold is practically included within 0 to 5 m./sec./sec. The detector 13 may be constituted by a Schmitt trigger utilizing an operational amplifier and operating in the same manner as the detector 12, and thus also develops a control signal as long as it remains in its second stable condition.

The overlapping signal generator 14 is adapted to produce a pip of a predetermined constant duration T (included for instance within 10 to 20 milliseconds) for a purpose which will be explained below. The generator 14, which may be constituted by a monostable multivibrator, receives the first control signal developed by the threshold detector 12 and is only responsive to the trailing edge of this control signal, by means for example of a differentiating network and a clipping means, to be switched and to produce the pip of constant duration the leading edge of which is therefore in time coincidence with the trailing edge of the first control signal developed by the threshold detector 12.

The first control signal developed by the threshold detector 12 is also amplified in the releasing control signal amplifier 15, which may be a conventional direct-coupled amplifier, and the amplified control signal is applied to a releasing electrovalve 18a of the actuating unit 18 to actuate said electrovalve.

The first control signal delivered by the threshold detector 12, the second control signal delivered by the threshold detector 13 and the pip delivered by the generator 14 are applied through directing diodes 16 to the isolating control signal amplifier 17, which may be also a conventional direct-coupled amplifier, and the amplified resulting control signal is applied to an isolating electrovalve 18b of the actuating unit 18 to actuate said electrovalve.

Figure 2:
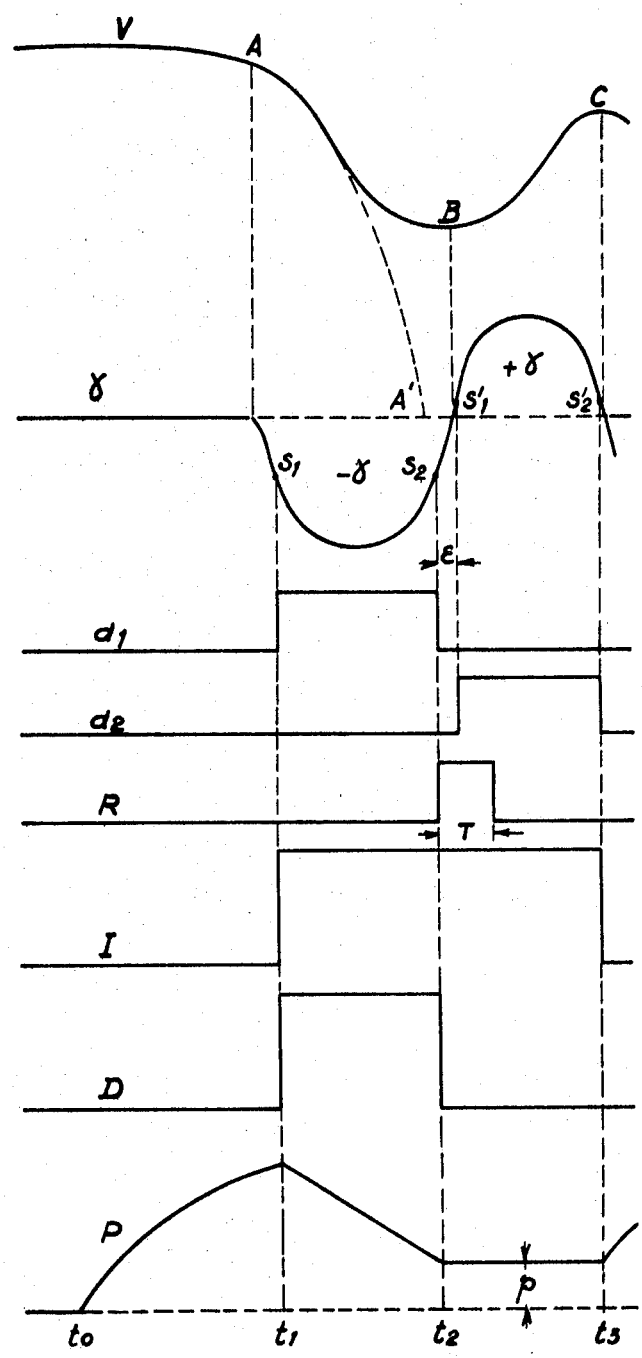
FIG. 2 represents diagrams relating to the operation of the device shown in FIG. 1.

Reference is now made to FIG. 2 of the drawings for an explanation of the operation of the just-described embodiment. The curve V represents the speed signal provided by the generator 10 and corresponds to the linear wheel speed. The curve $\gamma$ represents the acceleration signal provided by the generator 11 and corresponds to the linear wheel deceleration ($-\gamma$) and then to the linear wheel acceleration ($+\gamma$). The curve $d_1$ represents the first control signal delivered by the threshold detector 12. The curve $d_2$ represents the second control signal delivered by the threshold detector 13. The curve R represents the overlapping signal or pip delivered by the generator 14. The curve I represents the amplified resulting control signal provided by the amplifier 17 to actuate the isolating electrovalve 18b. The curve D represents the amplified control signal provided by the amplifier 15 to actuate the releasing electrovalve 18a and the curve P represents the pressure in the braking system.

The pressure (curve P) in the braking system is applied at an instant $t_o$. A short time interval later, at A on curve V, the wheel speed begins to decrease and, if the antiskid device according to the invention were not provided and if the vehicle driver continued to maintain a substantial pressure in the braking system, the wheel speed would decrease along the branch AA' and the wheel lockup would be reached at A'. However, thanks to the antiskid device, when the pressure developed by the driver in the braking system is too strong, as soon as the wheel deceleration reaches, at an instant $t_1$, a predetermined threshold value, the deceleration portion $-\gamma$ of the acceleration signal delivered by the generator 11 reaches the triggering level of the threshold detector 12 (at $S_1$ on curve V) so that this detector is triggered and then instantaneously develops the first control signal (curved $d_1$) which by means of the amplifier 17 actuates the isolating electrovalve 18b (curve I) of the actuating unit 18 so as to isolate the braking system from the brake pedal and which simultaneously by means of the amplifier 15 actuates the releasing electrovalve 18a (curve D) so as to progressively reduce the pressure in the braking system. Once the wheel deceleration has reached a maximum value, the wheel speed decreases more slowly and the wheel deceleration decreases and passes, at an instant $t_2$, through a second predetermined threshold valve substantially equal to the first threshold value while the deceleration portion $-\gamma$ of the acceleration signal then falls to the interrupting level of the threshold detector 12 (at $S_2$ on curve $\gamma$) so that the production of the first control signal is interrupted (curve $d_1$), the operation of the releasing electrovalve 18a is interrupted (curve D), and the operation of the isolating electrovalve would be also interrupted if at the said instant $t_2$ the trailing edge of the first control signal (curve $d_1$) did not initiate the production of the overlapping pip (curve R). However, at the instant $t_2$, the trailing edge of the first control signal triggers the generator 14 which instantaneously produces the overlapping pip which by means of the amplifier 17 maintains in operation the isolating electrovalve 18b (curve I). After a very short time interval $\epsilon$, the wheel speed ceases from decreasing (at B on curve V) and then begins to increase until a maximum value substantially corresponding to the vehicle speed is reached (at C on curve V). The wheel speed rapidly increases for the initial portion of the branch BC of the curve V, passes through a maximum value and then less rapidly increases for the remaining portion of the branch BC, so that the wheel acceleration firstly increases, passes through a maximum value and then decreases until it reaches a nil value. When the wheel speed begins to increase, the acceleration portion $+\gamma$ of the acceleration signal immediately reaches a low triggering level of the threshold detector 13 (at $S_1'$ on curve $\gamma$) so that this detector is triggered and then instantaneously produce the second control signal (curve $d_2$) which by means of the amplifier 17 maintains in operation the isolating electrovalve 18b (curve I). Since the threshold detector 13 is triggered for a low level of wheel acceleration, level which ranges from 0 to 5 m./sec./sec., it can be practically considered that the threshold detector 13 is triggered a very short time interval substantially equal to $\epsilon$ after the first control signal delivered by the threshold detector 12 (curve $d_1$) has been interrupted. Accordingly, the overlapping pip (curve R) is provided to maintain the isolating electrovalve 18b in operation during the very short time interval $\epsilon$. However, for reliability purposes the duration T of the overlapping pip is so selected as to be somewhat greater than the time interval $\epsilon$ (for example the duration T may be included within 10 to 20 milliseconds). Once the wheel acceleration has reached a maximum value, it decreases and the acceleration portion $+\gamma$ of the acceleration signal then falls to the interrupting level of the threshold detector 13 (at $S_2'$ on curve $\gamma$) so that the production of the second control signal (curve $d_2$) is interrupted at an instant $t_3$ for which the wheel speed reaches a maximum value which substantially corresponds to the vehicle speed (at C on curve V). The resulting control signal (curve I) for the isolating electrovalve 18b is therefore interrupted as well as the operation of this electrovalve. Accordingly, the brake pedal may now become again operative, and if the vehicle driver still develops a strong pressure in the braking system (as it is always practically the case), as soon as the wheel deceleration reaches again the first predetermined threshold value (corresponding to $S_1$ on curve $\gamma$), the cycle repeats itself. However, the speed loop ABC is now of lower magnitude and of shorter period and the same thing occurs for the other succeeding cycles which repeat themselves until the vehicle comes to a normal stop.

It must be noted that since the releasing electrovalve 18a ceases from operating at an instant $t_2$ which is in close proximity to the instant for which the wheel speed ceases from decreasing and is on the point of beginning to increase (at B on curve V), that means that the pressure $p$ which continues to exist in the braking system after the pressure release is compatible with the actual tire-road interface frictional force and that it is only necessary to maintain the pressure $p$, by keeping the braking system isolated, until the wheel speed has reached at C on curve V a maximum speed close to the vehicle speed.

If the isolation of the braking system were not maintained after the pressure release, the action exerted by the driver on the brake pedal would substantially increase the pressure in the braking system from B on the curve V and the wheel would be subjected to a further deceleration so that the wheel speed would deviate more and more from the vehicle speed, which of course is to be avoided to prevent the wheel to lock and therefore the vehicle to skid.

It must be also noted that the triggering levels of the threshold detectors 12 and 13 are adjustable and that the antiskid device is only operated when the brake pedal is depressed, in a manner for example of the energization of a stoplight.

Figure 3:
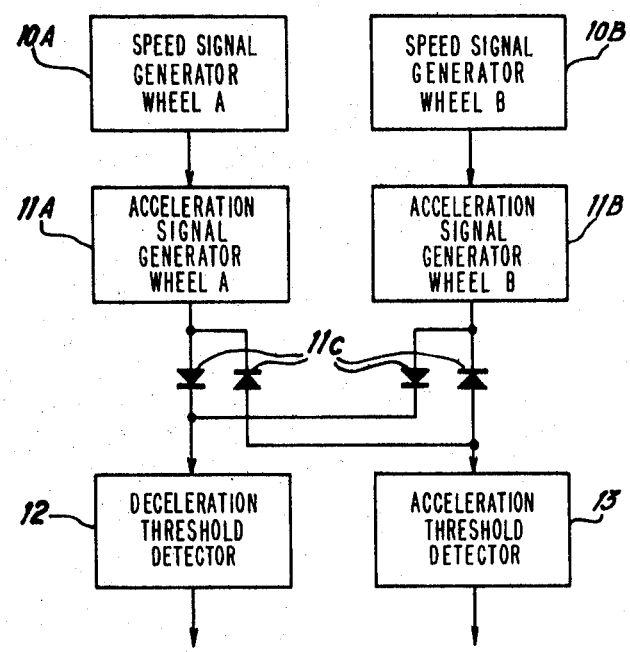
FIG. 3 represents in block form a portion of an antiskid device according to the invention for the two wheels of a same axle.

FIG. 3 partially represents a second embodiment of antiskid device for two wheels A and B of a same axle. The sensing unit comprises: a speed signal generator 10A for wheel A and a speed signal generator 10B for wheel B, each generator being similar to and operating in the same manner as the speed signal generator 10 described in connection with the antiskid device for a single wheel; an acceleration (or deceleration) signal generators 11A for wheel A and generator 11B for wheel B, each generator being similar to and operating in the same manner as the acceleration signal generator 11 described in connection with the antiskid device for a single wheel. The remaining elements of the sensing unit are the same as those represented in FIG. 1 for the single wheel antiskid device and are common for the two wheels A and B, only the threshold detector 12 of the deceleration portion $-\gamma$ and the threshold detector 13 of the acceleration portion $+\gamma$ having been represented in FIG. 3. Likewise, this second embodiment of antiskid device comprises a single actuating unit similar to and operating in the same manner as the actuating unit 18 of the first embodiment, the actuating unit being connected as shown in FIG. 1 and being common for the two wheels A and B, that is it simultaneously acts upon the braking pressures of the two wheels.

The speed signal provided by the generator 10A is applied to the generator 11A while the speed signal provided by the generator 10B is applied to the generator 11B. The acceleration signals delivered by the generators 11A and 11B are jointly applied by a diode-directing means 11C to the threshold detector 12 as well as to the threshold detector 13. Thanks to the diode-directing means 11C, only the one of the acceleration signals which is predominant at every instant is applied to the threshold detectors 12 and 13, so that the said detectors are only responsive to such a signal.

If during the application of the braking pressures one of them is too strong and tends to cause one wheel to lock, it is the acceleration signal relating to the said wheel which is processed by the antiskid device which then operates in the manner of the single wheel antiskid device, except the actuating unit simultaneously acts upon the two wheels. If the two braking pressures are too strong and tend to cause the two wheels to simultaneously lock, the acceleration signals relating to the two wheels are substantially similar and only one of the said signals is processed by the antiskid device which still operates in the manner of the single wheel antiskid device, as in the preceding case. Now, if the two braking pressures are too strong, but tend to cause the wheels to successively lock, the acceleration signal of the wheel which would come first to lockup would determine the isolating and releasing pressures, the acceleration signal of the wheel which would come in the second place to lockup would determine the end of the pressure release and it would be still the acceleration signal of the last-mentioned wheel which would cause the isolation of the pressures to cease. Accordingly, the respective durations of the pressure oscillation and of the pressure release would be increased with respect to those relating to the two preceding cases.

It must also be noted that for controlling two axles, for instance the front axle and the rear axle, it would be necessary to provide two complete antiskid devices according to FIG. 3, that is each device would include the components 10A, 10B, 11A, 11B, 11C, 12, 13, 14, 15, 16, 17 and 18.

While two preferred embodiments of the antiskid device according to the invention have been described and discussed, it is to be understood that the invention is not limited to these embodiments and that changes and modifications may be made therein without departing from the scope of the invention which is defined in the appended claims.

What is claimed is:

1. In a vehicle-braking system actuated by a brake pedal, an antiskid device comprising:

means for generating a speed signal proportional to the speed of a wheel of the vehicle;

means for generating an acceleration and deceleration signal from said speed signal proportional to the acceleration and deceleration of said wheel;

threshold-detecting means responsive to said deceleration signal for generating a first output signal when the deceleration signal attains a first value, to terminate said first output signal when the deceleration signal attains a second value, said detecting means generating a second output signal when the acceleration signal attains a third value and terminating said second output signal when the acceleration signal attains a fourth value;

means responsive to termination of said first output signal for generating an pulse signal for a predetermined time, said predetermined time being greater than the time interval between termination of said first output signal and initiation of said second output signal, but substantially less than the time interval between initiation and termination of said second output signal;

means responsive to said first and second output signals and to said pulse signal for generating a first control signal;

means responsive to said first output signal for generating a second control signal, said second control signal terminating when said first output signal terminates;

isolating electrovalve means responsive to said first control signal for isolating the brake pedal from the vehicle-braking system for the duration of said first control signal; and releasing electrovalve means responsive to said second control signal for progressively releasing the braking pressure generated within said vehicle-braking system for the duration of said second signal.

* * * * *